United States Patent [19]

Torenbeek et al.

[11] 4,342,844
[45] Aug. 3, 1982

[54] PROCESS FOR PREPARING PEROXIDE MASTER BATCHES

[75] Inventors: Reinder Torenbeek, Twello; Jan D. van Drumpt, Deventer; Gerrit F. Drost, Schalkhaar, all of Netherlands

[73] Assignee: Akzona Incorporated, Asheville, N.C.

[21] Appl. No.: 212,951

[22] Filed: Dec. 4, 1980

[30] Foreign Application Priority Data

Dec. 13, 1979 [NL] Netherlands .......................... 7908964

[51] Int. Cl.$^3$ .............................................. C08F 8/06
[52] U.S. Cl. .................................... 525/387; 525/263; 525/265; 525/324; 525/333.8
[58] Field of Search ................ 525/387; 260/29, 15 B, 260/33.6 UA, 33.6 U, 29.6 CM, 29.6 PT, 29.7 B, 29.7 T

[56] References Cited

U.S. PATENT DOCUMENTS

| | | | |
|---|---|---|---|
| 3,105,057 | 9/1963 | Medalia | 525/387 |
| 3,242,159 | 3/1966 | Kaufman | 525/387 |
| 3,923,947 | 12/1975 | Cook | 525/387 |
| 4,006,283 | 2/1977 | MacKenzie et al. | 525/387 |
| 4,243,773 | 1/1981 | Arnaud et al. | 525/387 |
| 4,278,777 | 7/1981 | Jakabhazy et al. | 525/387 |

*Primary Examiner*—William F. Hamrock
*Attorney, Agent, or Firm*—Francis W. Young; Robert F. Green

[57] ABSTRACT

A process for the preparation of an organic peroxide master batch comprising about 20–60% by weight of an organic peroxide and about 40–80% by weight of a polymer capable of being cross-linked by the peroxide, is disclosed. The process comprises contacting particles of such a polymer, having a diameter from about 200 microns to about 20 millimeters, at a temperature from about 15° C. to about 95° C., with a liquid medium which is not a physically stable emulsion and which comprises from about 2 to about 100 percent, by weight, of a peroxide which is a liquid at said temperature and from about 0 to about 98 percent, by weight, of a suitable liquid in which the peroxide and the polymer are insoluble, for a period of time sufficient to incorporate from about 20 to about 60 percent of peroxide in the polymer particles, based on the total weight of the polymer particles containing the peroxide, said medium being present in such an amount that after the incorporation of the peroxide essentially all of the polymer particles are completely surrounded by the liquid medium.

4 Claims, No Drawings

PROCESS FOR PREPARING PEROXIDE MASTER BATCHES

BACKGROUND OF THE INVENTION

The present invention relates to a process for the preparation of a master batch comprising an organic peroxide and a polymer capable of being cross-linked with the peroxide.

The need for preparing master batches of peroxides arises from the fact that the peroxides that are commonly used for, for instance, the cross-linking of polymers are liquid or have such a low melting point that they melt upon being mixed into the polymer as a result of the frictional heat then developed or because of the mixing taking place at elevated temperature. This complicates intermixing in that the peroxide flows away and/or lubricates the polymer, as a result of which the polymer particles no longer stick together during mixing and escape the mixing action. In order that the peroxides may yet be properly dispersed in the polymer, generally in a weight ratio of 0.5–5.0%, relatively long mixing times are required. The high temperatures that occur then may give rise to premature cross-linking of the polymer and promote the development of flammable or explosive peroxide vapors.

To avoid the aforementioned difficulties it has been proposed to incorporate peroxides into solid carriers such as silica, chalk and talc. Although in such a manner the peroxides may be incorporated into the polymer more rapidly, it has been found that the carriers are difficult to disperse rapidly and uniformly in the polymer. For some uses the presence of such carriers in the final product is undesirable.

The foregoing problems have led to the development of master batches. Characteristic of master batches is that the concentration of the peroxide in the polymer is considerably higher than the concentration in which the peroxide is to be mixed into the polymer to be finally cross-linked. The polymer from which the master batch is built up should be identical with or closely related to the polymer to be finally cross-linked. It has been found that when these master batches are mixed in, uniform and rapid dispersion of the peroxide is obtained. The master batches known so far are generally prepared with the aid of roll mills, internal mixers or compounding extruders. Such methods have the disadvantage, however, that mixing the peroxide into the polymer is attended with the release of heat or the need for using heat, which may result in partial decomposition of the peroxide.

Internal mixers and compounding extruders are entirely closed during mixing, so that decomposition of the peroxide induced by overheating or contamination may be attended with a pressure build-up. Master batches mixed on a roll mill moreover have the disadvantage that they contain a relatively high proportion of filler and are therefore relatively hard. This is to be attributed to the fact that in order that the peroxide may be properly mixed in, it must be incorporated into a solid carrier. Furthermore, the preparation of such master batches is very labor intensive and the resulting product is obtained in the form of sheets. To facilitate handling of the master batches and in view of the envisaged application they are preferably chopped or cut into granules.

It should be noted that U.S. Pat. No. 3,301,813 describes a process for the preparation of a powdered concentrate consisting of 40–60% by weight of a liquid additive and 60–40% by weight of a dry, porous polymer. In said patent specification no mention is made of peroxides. Concentrations of particular additives in thermoplastic polymers are also described in U.S. Pat. No. 3,637,571. In that case, however, the polymer is contacted with solutions or suspensions of the additive and peroxides are not mentioned in the specification either. Moreover, the method described is unsuitable to be used for the preparation of master batches of peroxides because the required high concentration of peroxides cannot be attained, at least not within an acceptable contact time.

In Netherlands Pat. No. 7,313,256, there is revealed a process of the type described in U.S. Pat. No. 3,637,571, for incorporating relatively small amounts of peroxides into the polymer to be finally cross-linked. As can be derived from the degree of cross-linking mentioned in Example 4 of Netherlands Pat. No. 7,313,256, only 2–3% by weight of peroxide is incorporated into the polymer following its being contacted with a 40%-solution of dicumyl peroxide for 75 minutes at 65° C.

West German Pat. No. 2,124,941, too, describes a process for incorporating peroxide, in an amount of 0.5–5% by weight, into the polymer which is finally to be cross-linked. Apart from the fact that the method proposed is unpractical for the preparation of master batches, the other methods described would give rise to excessive sticking together of polymer particles.

Finally, British Pat. No. 1,489,580 describes a process in which shaped polymeric objects are contacted with a stable peroxide emulsion. The method is only suitable for incorporating relatively small amounts of peroxide and can therefore not be used for the preparation of master batches.

SUMMARY OF THE INVENTION

The present invention provides a novel process for preparing master batches comprising about 20–60% by weight of an organic peroxide and 40–80% by weight of a polymer capable of being cross-linked by the peroxide, which process does not display the drawbacks of the prior art processes. The process comprises contacting particles of such a polymer, having a diameter from about 200 microns to about 20 millimeters, at a temperature from about 15° C. to about 95° C., with a liquid medium which is not a physically stable emulsion and which comprises from about 2 to about 100 percent, by weight, of a peroxide which is a liquid at said temperature and from about 0 to about 98 percent, by weight, of a suitable liquid in which the peroxide and the polymer are insoluble, for a period of time sufficient to incorporate from about 20 to about 60 percent of peroxide in the polymer particles, based on the total weight of the polymer particles containing the peroxide, said medium being present in such an amount that after the incorporation of the peroxide essentially all of the polymer particles are completely surrounded by the liquid medium.

DETAILED DESCRIPTION OF THE PREFERRED EMBODIMENTS

For the present method of preparation use may be made in principle of particles of all polymers capable of being cross-linked with peroxides. Suitable particles would thus include those comprised principally of polymers such as polyethylene, chlorosulphonated polyethylene, chlorinated polyethylene, polybutylene, polyisobutylene, ethylene vinyl acetate copolymers, ethylene propylene copolymers, polybutadiene, polyisoprene, butadienestyrene copolymers, natural rubber, polyacrylate rubber, butadiene-acrylonitrile copolymers, acrylonitrile-butadienestyrene terpolymers, silicone rubber, polyurethanes, and polysulphides. It is preferred, however, that use should be made of particles that entirely or practically entirely consist of copolymers of ethylene, such as ethylene-vinyl acetate (EVA) and ethylene-propylene copolymers (EPM and EPDM). The polymer particles of the present invention do not contain porosity of the type found in the polymer used in accordance with U.S. Pat. No. 3,301,813 to prepare concentrates.

When the polymer is brought into contact with the liquid medium, it is in the form of particles. The particles preferably have a diameter from about 200 microns to about 20 millimeters, such as ground or non-ground chips, granules and pellets. Polymers in the form of fine powders are unsuitable and are therefore not covered by the above definition.

Into the polymer particles there may have been incorporated commonly used additives such as antioxidants, antiozonants, antidegradants, UV-stabilizers, coagents, antifungicides, antistats, pigments, dyes, coupling agents, dispersing aids, blowing agents, lubricants and process oils. To some polymers fillers may be added immediately after preparation.

The polymer particles are brought into contact with the liquid medium at a temperature in the range of about 15° to about 95° C. The lower limit of the temperature range is dictated by practical considerations. Below a temperature of about 15° C. the rate at which the peroxide may be incorporated into the polymer is unacceptably low for practical purposes. At a temperature above about 95° C. there is the risk of at least partial decomposition of the peroxide. It is preferred that the temperature should be in the range of about 50° to about 80° C.

The liquid medium with which the polymer particles are contacted comprises 2–100% by weight of a peroxide which is liquid at 15°–95° C. and 0–98% by weight of a liquid in which the peroxide and the polymer are insoluble. The organic peroxide may be any peroxide which can be employed for cross-linking polymers and is a liquid at the temperature at which the polymer particles are brought into contact with the liquid medium. Suitable peroxides are therefore both those that are already liquid at about 15° C. and those that melt between about 15° and about 95° C. Suitable peroxides include: dicumyl peroxide, 1,3- and 1,4-bis (tertiarybutyl peroxyisopropyl)benzene, 1,1-di-tertiary-butyl peroxy-3,3,5-trimethyl cyclohexane, 4,4-bis (tertiarybutyl peroxy) n-butyl valerate, ditertiary butyl peroxide, tertiary butyl-cumyl peroxide, tertiary butyl perbenzoate, 2,5-dimethyl-2,5-ditertiary butyl peroxyhexane, 2,5-dimethyl-2,5-ditertiary butyl peroxyhexyn-3 or mixtures of such peroxides.

When the medium contains both a peroxide which is liquid at about 15°–95° C. and one or more suitable liquids, as discussed below, the formation of a physically stable emulsion is excluded. The term "physically stable emulsion" means an emulsion which does not phase separate within 1 hour. It is therefore preferred that the use of surface active agents and/or protective colloids should be avoided. If they are to be used at all, then the amount in which they are employed must be such that no stable emulsion is formed. For it has been found that the use of stable emulsions is attended with such a decrease of the rate at which the peroxide is incorporated into the polymer that the high peroxide concentration required is not attained or is attained only after an impractically long contact time. The medium may therefore be considered to be a physically unstable dispersion in which either the peroxide or the suitable liquid is the dispersed phase and the other is the continuous phase. The dispersion would thus be capable of separating into the distinct phases after being left unadjutated for a period of one hour or less.

Also essential to the present process is that the liquid medium is used in an amount such that after the incorporation of the peroxide practically all polymer particles are still entirely surrounded by the liquid medium. Thus the polymer particles are not contiguous after the incorporation of the peroxide has occurred. The amount of liquid medium is generally about 1.2 to about 50 and preferably about 1.5 to about 20 times the amount of peroxide present in this medium for incorporation into the polymer. Should this criterion not be met, then the polymer particles will to a high degree stick together. The resulting product will then be far less suitable for its envisaged use as master batch. Such sticking together might be suppressed by adding an antiadhesive to a liquid medium. In order to obtain somewhat satisfactory results, however, such an agent would be needed in an amount of 5% by weight or higher, calculated on the amount of polymer. Apart from the fact that antiadhesives are relatively expensive, the incorporation thereof, particularly in such large quantities, is undesirable for some uses.

Application of the present process entirely or substantially prevents the occurrence of sticking. The system remains stirrable throughout the process and after incorporation into the polymer of the required amount of peroxide. Moreover, the polymer particles are prevented from being strongly pressed together. The liquid medium may entirely consist of peroxide but it is preferred, however, that the medium should contain a suitable liquid in which the peroxide and the polymer is insoluble. The term "insoluble" is used in this specification and the appended claims to mean a solubility of less than 0.02 g/ml.

Examples of suitable liquids are: water, glycols such as ethylene glycol and glycerol. It is preferred that the suitable liquid to be used should be water. It should be noted that the use of such liquids contributes to the safety of the process. Owing to the improved heat transfer the chance of local overheating is reduced to a minimum. The presence of the suitable liquid also leads to improved temperature control. Another advantage consists in that the liquid acts as a heat buffer if, unexpectedly, there should be any decomposition of the peroxide. The process according to the invention can without difficulty be carried out in an open apparatus.

The liquid medium comprises 2–100% by weight of the peroxide and 0–98% by weight of the above-mentioned suitable liquid. At peroxide concentrations below 2% by weight the yield of the present process would be unacceptably low in practice. It is preferred that the liquid medium should contain about 5–20% by weight of the peroxide and about 80–95% by weight of the above-mentioned suitable liquid.

The envisaged use of the master batch permitting, it is possible to add an antiadhesive to the medium. It may be used then in an amount of as little as about 0.1–5% by weight, calculated on the polymer. The antiadhesive is preferably added immediately after removal of the liquid medium. Suitable antiadhesives are silica, talc and clay. It is preferred that hydrophobic silica should be employed as the antiadhesive. If the polymer particles are sufficiently small, the present process can be carried out with the aid of a simple mixer such as a planetary mixer, a screw mixer or an anchor-type agitator or, in the presence of the above-mentioned liquid, with the aid of a propeller mixer or a turbine impeller. Should the polymer particles have to be reduced in size, use may be made then of high-speed mixers commonly used for this purpose.

The polymer particles are contacted with the liquid medium for a sufficient length of time to incorporate at least about 20% peroxide in the polymer particles, based on the total weight of the polymer and peroxide composite.

After the required amount of peroxide has been incorporated into the polymer, the liquid medium is separated from the polymer particles, for instance by screening. Should the liquid medium entirely consist of peroxide, then there is generally no need for the polymer particles to be washed and/or dried. These treatments are generally required if the liquid medium also contains a liquid in which the peroxide and the polymer are insoluble. Moreover, the polymer particles obtained may have to be cooled. The resulting master batch is obtained typically in the form of a free-flowing particles and may be contrasted with other master batches which are obtained in the form of fine powders. The master batch prepared in accordance with the present invention is mixed into the polymer which is finally to be cross-linked, typically in such an amount that the polymer contains 0.5-5.0% by weight of the peroxide.

The following non-limiting examples serve to illustrate the invention.

EXAMPLE 1

In a planetary mixer 450 grams of Perkadox ® 14-90, a product marketed by Akzo Chemie b.v. in Europe and by Noury Chemical Company in the United States under the trademark Percadox ®, and containing about 90% of a mixture of 1,3-bis (tertiary butyl peroxyisopropyl)benzene and 1,4-bis (tertiary butyl peroxyisopropyl)benzene was heated to 68° C. The melting point of this peroxide is 43° C. To the liquid peroxide there were added 200 grams of EPDM pellets (Nordel 1500 of Du Pont; diameter: 4 mm; thickness: 1,5 mm), after which the mixer was started. After 60 minutes the excess peroxide was poured off through a screen. After the remaining peroxide had been drained off, the pellets were re-introduced into the mixer, followed by adding 5 grams of hydrophobic silica. The mixture was stirred for another 5 minutes with heating. Subsequently, the planetary mixer was cooled for 45 minutes with continued stirring. In this way a free-flowing master batch was obtained having a peroxide content of 34%.

EXAMPLE 2

In a Nauta mixer (a conically shaped mixing vessel provided with a mixing screw) 5000 grams of 1,1-di-tertiary butyl peroxy-3,3,5-trimethyl cyclohexane having a peroxide concentration of 99.1% were mixed with 2850 grams of EPDM granules (Nordel 1500 Du Pont; diameter: 3.5 mm; thickness: 2-5 mm). After 2½ hours stirring at 60° C. the excess peroxide was removed and 250 grams of hydrophobic silica were added to the polymer peroxide, followed by 10 additional minutes stirring. There were obtained 6005 grams of a master batch containing 48.7% peroxide.

EXAMPLE 3

In a planetary mixer 1 liter of water and 155 grams of Perkadox ® 14-90 (a mixture of 1,3- and 1,4-bis(tertiary butyl peroxyisopropyl)benzene) were heated to a temperature of 68° C. To this mixture there were added 200 grams of EPDM pellets (Nordel 1500 Du Pont; diameter; 4 mm; thickness: 1.5 mm), after which the mixer was started. After 180 minutes the water and the non-incorporated peroxide were drained off through a screen. The EPDM pellets were re-introduced into the mixer, which was subsequently cooled with water for 45 minutes with stirring. The resulting master batch contained 36% peroxide.

EXAMPLE 4

In a planetary mixer 0,6 liters of water were heated to 80° C. Next, 130 grams of EPM granules (Epcar 306 G8 of Goodrich; diameter: 2 mm; thickness: 0.5-3 mm) and 150 grams of dicumyl peroxide (Perkadox ® BC 95 to Akzo Chemie b.v.; melting point 40° C.) were mixed in. After 200 minutes stirring at 80° C. the master batch was successively separated from the aqueous phase through a screen, cooled, washed and dried. The peroxide content was 52.1%.

EXAMPLE 5

In a planetary mixer 1500 grams of monoethylene glycol and 155 grams of Perkadox ® 14-90 (a mixture of 1,3- and 1,4-bis (tertiary butyl peroxyisopropyl)benzene) were heated to 68° C. To this mixture there were added 200 grams of EPDM pellets (Nordel 1500 of Du Pont; diameter: 4 mm; thickness: 1.5 mm), after which the mixer was started. After 60 minutes the monoethylene glycol and the peroxide that had not been incorporated yet were drained off through a screen. Subsequently, the mixer was cooled in accordance with the procedure followed in the preceding examples. Next, the master batch was washed free of monoethylene glycol with the aid of water. After this treatment the pellets were dried to the air. The peroxide content was 37%.

EXAMPLE 6

In a 3-liter beaker 1.5 liters of water were heated to 90° C. In it 120 grams of EPDM were dispersed in the form of crumbled particles (Nordel 1040 of Du Pont; particle size in the order of 5 mm). Over a period of 5 minutes 85 grams of dicumyl peroxide (Perkadox ® BC-95, melting point 40° C.) were dispersed in it at a low speed of about 2000 revolutions per minute. Mixing was continued 5 minutes at full speed (10,000 revolutions per minute). At the end of the mixing process the temperature was 78° C. After the mixer had been stopped, the polymer particles were introduced into cold water. After the mixer had been cooled, the polymer chips were isolated from the water and the remaining peroxide, and dried to the air. After this treatment the particle size was in the range of 0.5-3 mm. The peroxide content of the master batch was 35.5%.

EXAMPLE 7

In a stainless steel 5-liter vessel 3 liters of water were heated to 95° C. At a speed of about 4000 revolutions per minute 540 grams of crumbled EPDM particles (Nordel 1040 of Du Pont; size: about 5 mm) and 480 grams of Perkadox ® 14-90 (a mixture of 1,3- and 1,4-bis-tertiary butyl peroxysopropyl)benzene) were dispersed in the water. Subsequently, dispersion was continued for 10 minutes at a speed of 10000 revolutions per minute. After that the temperature was 87° C. The polymerperoxide mixture was isolated from the water, cooled, screened and dried to the air. The final particle size was in the range of 0.5–3 mm. The peroxide content of the master batch was 39.1%.

EXAMPLE 8

In a 3-liter beaker 270 grams of ethylene vinyl acetate copolymer pellets (Alkathene 546 of I.C.I.; diameter: 2 mm, thickness: 0.5–3 mm) were dispersed in 1.5 liters of water of 80° C. The polymer particles were crushed by having the Ultra-Turrax mixer rotate at a speed of 10000 revolutions per minute over a period of 10 minutes. To the mixture there were added 240 grams of Perkadox ® 14-90 (a mixture of 1,3- and 1,4-bis(tertiary butyl peroxyisopropyl)benzene), followed by dispersion for 5 minutes at a speed of 2000 revolutions per minute and another 5 minutes at a speed of 10000 revolutions per minute. Subsequently, the mixture was cooled to 50° C. by adding ice. The master batch was screened off, further cooled and dried. The master batch contained 39.6% peroxide.

EXAMPLE 9

In a planetary mixer 260 grams of dicumyl peroxide (Perkadox ® BC-95) and 600 ml of water were heated to 65° C. (melting point peroxide 40° C.). 340 grams of ethylene vinyl acetate copolymer pellets (Alkathene 540 of I.C.I.; diameter: 2 mm; thickness: 0.5–3 mm) were added, with stirring. The mixture was stirred for 60 minutes at 65° C., followed by cooling for 15 minutes, with stirring. The resulting master batch was screened off and dried. The free-flowing master batch had a peroxide content of 42.3%.

EXAMPLE 10

In a 3-liter beaker 100 grams of an uncrosslinked silicone rubber (Silopren HV3/500U) mixed with silica in the form of particles having a size of about 2 cm$^3$ were added, with stirring, to 1.5 liters of water with the aid of an Ultra-Turrax mixer (speed: 10000 revolutions per minute). At a temperature of 95° C. 100 grams of dicumyl peroxide (Perkadox ® BC-95) were added, followed by stirring for 5 minutes at a speed of 3000 and 5 minutes at a speed of 10000 revolutions per minute. Subsequently, the polymer particles were isolated and cooled. The peroxide content of the master batch was 34.4%.

What is claimed is:

1. A process for the preparation of an organic peroxide master batch comprising from about 20 to about 60 percent by weight of an organic peroxide and from about 40 to about 80 percent by weight of a polymer capable of being cross-linked by the peroxide comprising (1) contacting particles of said polymer, having a diameter from about 200 microns to about 20 millimeters, at a temperature from about 15° C. to about 95° C., with a liquid medium which is not a physically stable emulsion and which comprises from about 2 to about 100 percent, by weight, of a peroxide which is a liquid at said temperature and from about 0 to about 98 percent, by weight, of a suitable liquid in which the peroxide and the polymer are insoluble, for a period of time sufficient to incorporate from about 20 to about 60 percent of peroxide in the polymer particles, based on the total weight of the polymer particles containing the peroxide, said medium being present in such an amount that after the incorporation of the peroxide essentially all of the polymer particles are completely surrounded by the liquid medium (2) and subsequently separating the liquid medium from the polymer particles.

2. The process of claim 1 wherein the polymer particles are comprised of a copolymer of ethylene.

3. The process of claim 1 wherein the liquid medium comprises from about 5 to about 20 percent by weight of peroxide and from about 80 to about 95 percent by weight of the suitable liquid.

4. The process of claim 1, 2, or 3 wherein the suitable liquid is water.

* * * * *